July 15, 1930.  F. LAWACZECK  1,770,496
SHAFT PACKING
Filed Aug. 24, 1921
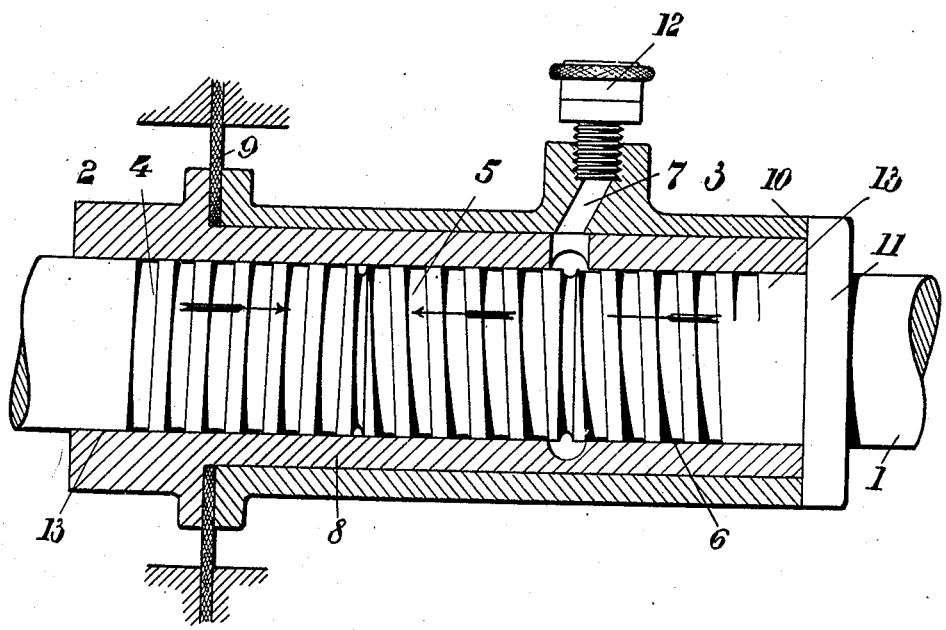

Patented July 15, 1930

1,770,496

UNITED STATES PATENT OFFICE

FRANZ LAWACZECK, OF POCKING, UPPER-BAVARIA, GERMANY, ASSIGNOR TO WORTHINGTON PUMP AND MACHINERY CORPORATION, OF NEW YORK, N. Y., A CORPORATION OF VIRGINIA

SHAFT PACKING

Application filed August 24, 1921, Serial No. 494,894, and in Germany August 25, 1916.

My invention relates to the packing of shafts and the like and more particularly to the packing by means of a liquid.

It has already been proposed to employ a liquid for effecting a perfect packing of a shaft which passes through the casing of a machine or engine, but these devices are imperfect as they make use of a current which is intended to circulate but in fact comes in contact with the liquid to be retained and therefore continuously carries away part of that liquid.

According to my invention, a perfect packing of a shaft is effected by means of a viscous liquid by arranging on the packing surface of a pair of viscosity pumps having helical grooves and working in opposite directions. In other words, I provide on the shaft or other part forming the packing surface two comparatively very fine, helical grooves which are very shallow in relation to their width and extend in opposite directions.

The depth of the said helical grooves, which may differ according to the character of the viscous liquid, is seldom more than one to two hundredths of an inch. The dimensions specified probably cover most of the viscous liquids that will be employed, but may vary in accordance with the viscosity of the liquid. There is a fundamental difference in result and operation with grooves of these very shallow dimensions of depth over the ordinary screw or helical grooves in that they make possible successful functioning with a liquid of high viscosity, the flow is substantially laminar without eddies being created, and the pressures developed are far greater. The pressure produced is a function amongst other things, of the depth and length, and the pitch of the grooves, the width of the gap between the stationary and the rotating part and the number of revolutions or the circumferential velocity, respectively.

By providing two such pumps having viscosity grooves and operating in opposite directions, a stationary column of liquid under high pressure is formed where the two pumps adjoin or, generally speaking, in a space intermediate the two pumps. This liquid column forms the packing for the shaft. No separate chamber need be provided for the packing liquid and in many cases the narrow clearance between the revolving and the stationary part of the viscosity pump, a sleeve or the body of the bearing, in case that the viscosity pump is formed as a bearing, will suffice.

Preferably the viscosity pump, which is nearest to the place to be packed is provided with a longer or flatter groove or the like to render this groove capable of producing a higher pressure than the other one. This prevents the viscous liquid from entering the place to be packed. It is further advantageous to supply the viscous liquid not at one end of the viscosity groove pump, but at some points intermediate its ends and, if necessary, under pressure.

In the drawings affixed to this specification and forming part thereof a sectional view of an arrangement embodying my invention is illustrated diagrammatically by way of example.

Referring to the drawings, 1 is the shaft traversing two chambers 2 and 3, the pressure in the chamber 2 in the example specified being assumed to be higher than the pressure in chamber 3. A liquid or high pressure steam, any leakage of which along shaft 1 must be absolutely prevented, is supposed to fill chamber 2.

To this end, I provide on the shaft a plurality of viscosity groove pumps 4, 5 and 6, the pumps 4 and 5 operating in opposite directions and being so designed that pump 4 is capable of producing a higher pressure than pump 5. The viscous liquid is supplied to pump 5 through a bore 7.

Some part of the casing, such as a sleeve 8, which is easily replaceable, tightly surrounds the shaft, in order to avoid an alteration of the width of the gap which might occur when the shaft 11 sinks owing to its bearings, wearing out, and which would influence its operation very considerably, the sleeve 8 is preferably adapted to be displaced in relation to the casing and supported on shaft 1 as illustrated. To this end, I may provide a diaphragm 9 or the like between sleeve 8 and the casing proper. Under certain conditions it may be desirable to make the end face of the sleeve 8 abut against a ring 11 on shaft 1.

The outer helical pump 6 may be a continuation of pump 5 so that the liquid is supplied at 7 in a full turn of the helical groove. The helical groove 6 is provided more particularly in order to prevent the viscous liquid from leaking if supplied to the shaft under pressure, and to keep it moving toward the pump 5.

As the shaft starts rotating, the viscosity pump 5 forces the viscous liquid toward the chamber 2 as indicated by the arrow. The liquid will then enter the first grooves of the opposite pump 4. This pump, however, being capable, when completely filled, owing to its longer or shallower grooves, to produce higher pressure than pump 5, this pressure counteracting the pressure produced by pump 5, its grooves are not filled on their entire length and in the course of operation, a state of equilibrium is reached in which the two pumps 4 and 5, where they adjoin, maintain a viscous packing liquid under high pressure, without this liquid being displaced considerably in one or the other direction. The stationary liquid in these parts of the packing surfaces which form part of both pumps, acts in the manner of a plug in relation to the difference of pressure between chambers 2 and 3 and absolutely prevents any leakage of liquid or the like from chamber 2.

Preferably the viscous liquid supplied to the helical groove through bore 7 is grease contained in a grease cup 12 or some other suitable device which exerts a permanent pressure on the packing liquid and the grease.

Instead of extending the thread of pump 4 down to the end of the casing surrounding the helical groove, for instance the sleeve 8, I prefer employing a groove which ends at some distance from the end of the shaft, so that a smooth surface not provided with threads, extends in the sleeve 8.

I wish it to be understood that I do not desire to be limited to the exact details of construction shown and described, for obvious modifications will occur to a person skilled in the art. For instance it is not necessary that all the viscosity groove pumps should have the same diameter, as illustrated.

I claim:

1. A device for placing viscous substances under pressure comprising in combination, members in contact with one another, one being adapted to revolve relatively to the other, a spiral groove in the contact surface of one of said members, means for feeding a viscous substance into the suction end of said groove and another spiral groove in the contact surface of one of said members arranged to feed towards the pressure end of said first groove.

2. In a device for packing rotary shafts, the combination with a shaft and a stationary part surrounding the shaft, of a viscosity thread pump, a second viscosity thread pump acting in the opposite direction thereto, the space between said pumps being closed to discharge, flat grooves between the threads of said pumps, said grooves being very shallow as compared with their width and sufficiently shallow to cause substantial laminar flow without eddies, and means for supplying said first mentioned pump with a viscous body at a point intermediate the ends of said pump.

3. In a device for packing rotary shafts, the combination with a shaft and a stationary part surrounding the shaft, of a viscosity thread pump, a second viscosity thread pump acting in the opposite direction thereto, the space between said pumps being closed to discharge and the grooves between the threads of said pumps being very shallow as compared with their width and sufficiently shallow to cause substantial laminar flow without eddies, and means for supplying only one of said pumps with a viscous body under pressure.

4. In a device for packing rotary shafts, the combination with a shaft and a stationary part surrounding the shaft, of a viscosity thread pump, a higher pressure viscosity thread pump acting in the opposite direction thereto, the space between said pumps being closed to discharge, and means for supplying a viscous body under pressure solely to the first mentioned pump.

5. In a device for packing rotary shafts, the combination with a shaft and a stationary part surrounding the shaft, of a viscosity thread pump, a higher pressure viscosity thread pump acting in the opposite direction thereto, the space between said pumps being closed to discharge, and means for supplying said first mentioned pump with a viscous body at a point intermediate the ends of said first mentioned pump.

In testimony whereof I affix my signature.

FRANZ LAWACZECK.